United States Patent
Liu et al.

(10) Patent No.: US 11,012,959 B2
(45) Date of Patent: *May 18, 2021

(54) DEMODULATION REFERENCE SIGNAL TRANSMISSION METHOD AND APPARATUS

(71) Applicant: Huawei Technologies Co., Ltd., Shenzhen (CN)

(72) Inventors: Jin Liu, Shenzhen (CN); Pu Yuan, Shenzhen (CN); Jun Luo, Kista (SE); Zhengzheng Xiang, Shanghai (CN); Lu Rong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,459

(22) Filed: Jul. 30, 2020

(65) Prior Publication Data

US 2020/0359345 A1 Nov. 12, 2020

Related U.S. Application Data

(63) Continuation of application No. 16/141,099, filed on Sep. 25, 2018, which is a continuation of application No. PCT/CN2018/085707, filed on May 4, 2018.

(30) Foreign Application Priority Data

May 5, 2017 (CN) .......................... 201710313724.5

(51) Int. Cl.
*H04W 56/00* (2009.01)
*H04L 5/00* (2006.01)
(Continued)

(52) U.S. Cl.
CPC ............. *H04W 56/001* (2013.01); *H04L 5/00* (2013.01); *H04L 5/0007* (2013.01);
(Continued)

(58) Field of Classification Search
CPC . H04W 56/001; H04W 72/005; H04W 72/04; H04L 27/26; H04L 5/00;
(Continued)

(56) References Cited

U.S. PATENT DOCUMENTS 10,673,667 B2 * 6/2020 Lee ...................... H04L 25/0226
2011/0194401 A1 8/2011 Akita et al.
(Continued)

FOREIGN PATENT DOCUMENTS

| CN | 106549745 A | 3/2017 |
| CN | 106559206 A | 4/2017 |

(Continued)

OTHER PUBLICATIONS

CATT, Transmission scheme and DMRS of NR PCBH, 3GPP TSG RAN WG1 Meeting #88bis R1-1704537, Spokane, USA, Apr. 3-7, 2017, (Year: 2017).*

(Continued)

*Primary Examiner* — Mounir Moutaouakil
(74) *Attorney, Agent, or Firm* — Slater Matsil, LLP

(57) ABSTRACT

A signal transmission method and an apparatus are disclosed. In an embodiment a signal transmission method includes generating a demodulation reference signal and sending the demodulation reference signal, wherein the demodulation reference signal is sent in a specific time-frequency resource, and the specific time-frequency resource is located on symbols corresponding to a synchronization signal block.

24 Claims, 12 Drawing Sheets

(51) Int. Cl.
    *H04L 27/26* (2006.01)
    *H04W 72/00* (2009.01)
    *H04W 72/04* (2009.01)

(52) U.S. Cl.
    CPC ............ *H04L 5/0048* (2013.01); *H04L 27/26* (2013.01); *H04W 72/005* (2013.01); *H04W 72/04* (2013.01)

(58) Field of Classification Search
    CPC . H04L 5/0048; H04L 5/0007; H04L 27/2655; H04L 5/0008
    See application file for complete search history.

(56) References Cited

U.S. PATENT DOCUMENTS

| | | | |
|---|---|---|---|
| 2012/0220239 A1 | 8/2012 | Hosoya et al. | |
| 2012/0302254 A1 | 11/2012 | Charbit et al. | |
| 2013/0315083 A1 | 11/2013 | Jung | |
| 2014/0204851 A1 | 7/2014 | Chen et al. | |
| 2014/0302796 A1 | 10/2014 | Gormley et al. | |
| 2015/0003356 A1* | 1/2015 | Seo | H04L 5/0048 370/329 |
| 2015/0245308 A1 | 8/2015 | Lorca Hernando | |
| 2015/0304878 A1* | 10/2015 | Wang | H04L 5/0094 370/252 |
| 2015/0305005 A1* | 10/2015 | Webb | H04L 5/0048 370/336 |
| 2017/0094547 A1* | 3/2017 | Yum | H04W 56/001 |
| 2017/0347353 A1* | 11/2017 | Yerramalli | H04L 1/0031 |
| 2018/0176065 A1 | 6/2018 | Deng et al. | |
| 2018/0248735 A1 | 8/2018 | Zhang et al. | |
| 2019/0123870 A1* | 4/2019 | Frenne | H04B 7/0617 |
| 2019/0132029 A1* | 5/2019 | Sun | H04B 7/0695 |

FOREIGN PATENT DOCUMENTS

| | | |
|---|---|---|
| JP | 2019515042 A | 6/2019 |
| WO | 2011137345 | 11/2011 |
| WO | 2014116944 A2 | 7/2014 |
| WO | 2018198341 A1 | 11/2018 |

OTHER PUBLICATIONS

CATT,NR Paging Channel,3GPP TSG RAN WG1 Meeting #88bis R1-1704539, Spokane, WA, USA Apr. 3-7, 2017 (Year: 2017).*
CATT,NR PBCH and NR physical channel carried system information, 3GPP TSG RAN WG1 Meeting #88bis R1-1704538 Spokane, USA, Apr. 3-7, 2017 (Year: 2017).*
ZTE, ZTE Microelectronics, "NR-PBCH and Delivery of Minimum SI", 3GPP TSG RAN WG1 AH_NR Meeting R1-1700101, Spokane, USA, Jan. 16-20, 2017, 8 pages.
Huawei, Hisilicon, "Analysis and evaluation on RS configuration for RRM measurement of Connected and Idle UEs", 3GPP TSG RAN WG1 NR Ad Hoc Meeting, R1-1700403, Spokane, USA, Jan. 16-20, 2017, 7 pages.
ZTE et al., "NR-PBCH Design", 3GPP TSG RAN WG1 Meeting #88bis, R1-1704361, Apr. 3-7, 2017, 9 pages, Spokane, USA.
Samsung, "NR-PBCH designs", 3GPP TSG Ran WG1 #88, R1-1702905, Feb. 13-17, 2017, 13 pages, Athens, Greece.
Schaich, F. et al., "Preliminary results for multi service support in link solution adaptation", May 30, 2016, 8 pages.
MediaTek Inc., "TDM Based Unified SS Block Design: Signal Structure and Performance", 3GPP TSG RAN WG1 #88, R1-1702727, Feb. 13-17, 2017, 6 pages, Athens, Greece.
ZTE et al.,"NR-PBCH Design", 3GPP TSG RAN WG1 #88, R1-1701577, Feb. 13-17, 2017, pp. 12, Athens, Greece.

* cited by examiner

DEMODULATION REFERENCE SIGNAL TRANSMISSION METHOD AND APPARATUS

CROSS-REFERENCE TO RELATED APPLICATIONS

This application is a continuation of US patent application Ser. No. 16/141,099, filed on Sep. 25, 2018, which is a continuation of International Patent Application No. PCT/CN2018/085707, filed on May 4, 2018, which claims priority to Chinese Patent Application No. 201710313724.5, filed on May 5, 2017. All of the afore-mentioned patent applications are hereby incorporated by reference in their entireties.

TECHNICAL FIELD

This application relates to the communications field, and more specifically, to a signal transmission method and apparatus.

BACKGROUND

In Long Term Evolution (LTE), a physical broadcast channel (PBCH) occupies six physical resource blocks (PRB) (namely, 72 subcarriers) on both sides of a central frequency and four consecutive OFDM symbols. The LTE-PBCH can support a 1, 2, or 4-antenna port (AP) transmission solution.

A demodulation reference signal of the LTE-PBCH is a cell-specific reference signal (CRS). The CRS in LTE is used for coherent demodulation of a PBCH signal, and further used for radio resource management (RRM) measurement, channel state information measurement, and coherent demodulation of a data channel and a control channel. The CRS occupies entire system bandwidth, is distributed in 10 sub-frames, and supports four APs. Therefore, the CRS has relatively high resource overheads and is unsuitable for a 5G new radio access (NR) system.

Therefore, a reference signal transmission solution suitable for NR is urgently needed, to reduce resource overheads.

SUMMARY

Embodiments provide a signal transmission method and apparatus, to reduce resource overheads.

According to a first aspect, a signal transmission method is provided, including generating a reference signal and sending the reference signal, where the reference signal is sent in a specific time-frequency resource, and the specific time-frequency resource is located on symbols corresponding to a synchronization signal block.

In an embodiment of the disclosure, the reference signal can be sent only in a specific time-frequency resource area on the symbols corresponding to the synchronization signal block, instead of being distributed on entire system bandwidth of a radio frame. In this way, the reference signal in this embodiment of this application can be used to ensure demodulation of a signal on the symbols corresponding to the synchronization signal block, for example, PBCH demodulation. In addition, a relatively small quantity of time-frequency resources is occupied, thereby reducing resource overheads.

In some possible implementations, the reference signal is discretely sent in the specific time-frequency resource. To be specific, the reference signal is discretely mapped in the specific time-frequency resource. In other words, REs mapped to the reference signal are not centrally distributed.

In some possible implementations, the specific time-frequency resource includes at least one symbol corresponding to a physical broadcast channel PBCH of the synchronization signal block.

In some possible implementations, in the specific time-frequency resource, a plurality of resource elements REs mapped to the reference signal are not adjacent in time domain and not adjacent in frequency domain, or a plurality of REs mapped to the reference signal are adjacent in time domain and not adjacent in frequency domain, or a plurality of REs mapped to the reference signal are adjacent in frequency domain and not adjacent in time domain.

In some possible implementations, a time domain range of the specific time-frequency resource is the symbols corresponding to the synchronization signal block, and may be some of the symbols corresponding to the synchronization signal block or all of the symbols corresponding to the synchronization signal block. A frequency domain range of the specific time-frequency resource may be a subcarrier corresponding to the PBCH of the synchronization signal block, or may be entire system bandwidth.

In some possible implementations, reference signals of different cells may be mapped to different resource locations. To be specific, resource mapping of the reference signal may rely on a cell identifier, thereby avoiding mutual reference signal interference between cells.

In some possible implementations, when performing channel estimation, a terminal device may perform linear interpolation on a neighboring reference signal to relatively precisely estimate an RE to which no reference signal is mapped, thereby ensuring PBCH demodulation accuracy.

A reference signal may exist on a symbol corresponding to each PBCH. Therefore, for PBCH demodulation, channel estimation may be performed without relying on a synchronization signal.

In some possible implementations, the reference signal is mapped to REs that are consecutive in time domain or frequency domain, so that a quantity of APs of the reference signal can be increased by using orthogonal cover code on consecutive resources, thereby supporting a multi-AP PBCH transmission solution.

In some possible implementations, the reference signal is not sent on the at least one symbol corresponding to the PBCH.

When the reference signal is sent on one symbol corresponding to the PBCH, when performing channel estimation, the terminal device may perform linear interpolation on a secondary synchronization signal (SSS) and a neighboring reference signal to relatively precisely estimate an RE to which no reference signal is mapped, thereby ensuring PBCH demodulation accuracy. In this way, resource overhead of the reference signal in the symbol corresponding to the PBCH is reduced.

In some possible implementations, a quantity of REs mapped to the reference signal in a first area of the specific time-frequency resource is greater than a quantity of REs mapped to the reference signal in a second area of the specific time-frequency resource, a primary synchronization signal and/or a secondary synchronization signal of the synchronization signal block are/is not sent on a subcarrier corresponding to the first area, and the primary synchronization signal and/or the secondary synchronization signal are/is sent on a subcarrier corresponding to the second area.

When a SSS is sent, the terminal device may improve PBCH estimation accuracy by performing linear interpolation on the SSS, thereby lowering a requirement for the reference signal.

In some possible implementations, the specific time-frequency resource further includes a symbol corresponding to the primary synchronization signal and/or the secondary synchronization signal of the synchronization signal block.

In a third area of the specific time-frequency resource, the reference signal is sent on the symbol corresponding to the primary synchronization signal and/or the secondary synchronization signal. In a fourth area of the specific time-frequency resource, the reference signal is not sent on the symbol corresponding to the primary synchronization signal and/or the secondary synchronization signal. The primary synchronization signal and/or the secondary synchronization signal are/is not sent on a subcarrier corresponding to the third area. The primary synchronization signal and/or the secondary synchronization signal are/is sent on a subcarrier corresponding to the fourth area.

On a PRB without a SSS, the terminal device may improve PBCH estimation accuracy by performing linear interpolation on a time-domain reference signal while no or few resources of the PBCH are occupied.

In some possible implementations, the frequency domain range of the specific time-frequency resource is the subcarrier corresponding to the PBCH of the synchronization signal block.

In some possible implementations, the generating a reference signal includes generating the reference signal by using a time-frequency resource unit as a unit, where the time-frequency resource unit is located on the symbols corresponding to the synchronization signal block.

In some possible implementations, the time-frequency resource unit is a time-frequency resource corresponding to the PBCH of the synchronization signal block on at least one physical resource block PRB, or the time-frequency resource unit is a time-frequency resource corresponding to the primary synchronization signal and/or the secondary synchronization signal of the synchronization signal block on at least one PRB, or the time-frequency resource unit is a time-frequency resource corresponding to the synchronization signal block on at least one PRB.

In some possible implementations, a parameter for generating the reference signal is associated with at least one of a cell ID, a subband sequence number, a PRB sequence number, and an antenna port number.

In some possible implementations, the sending the reference signal includes mapping the reference signal by using the time-frequency resource unit as a unit.

In some possible implementations, a manner of mapping the reference signal is associated with at least one of the cell ID, the subband sequence number, the PRB sequence number, and the antenna port number.

According to a second aspect, a signal transmission method is provided, including generating a reference signal by using a time-frequency resource unit as a unit, where the time-frequency resource unit is located on symbols corresponding to a synchronization signal block and sending the reference signal.

In an embodiment of this disclosure, a unit based on which a network device generates the reference signal is limited to the symbols corresponding to the synchronization signal block, instead of a radio frame. In this way, a reference signal sequence may be repeated for different synchronization signal blocks, and therefore a terminal device does not need to extract a sequence from a long sequence during reference signal detection.

In some possible implementations, a time domain range of the time-frequency resource unit is the symbols corresponding to the synchronization signal block, and may be all of the symbols corresponding to the synchronization signal block or some of the symbols corresponding to the synchronization signal block. For example, the time domain range of the time-frequency resource unit may be a symbol corresponding to a PBCH of the synchronization signal block. A frequency domain range of the time-frequency resource unit may be all subcarriers corresponding to the synchronization signal block, or subcarriers of one or more PRBs corresponding to the synchronization signal block, or entire system bandwidth.

In some possible implementations, the time-frequency resource unit is a time-frequency resource corresponding to the physical broadcast channel (PBCH) of the synchronization signal block on at least one physical resource block (PRB), or the time-frequency resource unit is a time-frequency resource corresponding to a primary synchronization signal and/or a secondary synchronization signal of the synchronization signal block on at least one PRB, or the time-frequency resource unit is a time-frequency resource corresponding to the synchronization signal block on at least one PRB.

In some possible implementations, for a multi-subband system, the frequency domain range of the time-frequency resource unit may be expanded to the entire system bandwidth.

In some possible implementations, a parameter for generating the reference signal is associated with at least one of a cell ID, a subband sequence number, a PRB sequence number, and an antenna port number.

In some possible implementations, the sending the reference signal includes mapping the reference signal by using the time-frequency resource unit as a unit.

A reference signal may independently be generated and mapped based on each time-frequency resource unit. This manner is easy to expand, and is not limited by a size of a physical channel resource block.

In some possible implementations, a manner of mapping the reference signal is associated with at least one of the cell ID, the subband sequence number, the PRB sequence number, and the antenna port number.

According to a third aspect, a signal transmission method is provided, including receiving a reference signal, where the reference signal is sent in a specific time-frequency resource, and the specific time-frequency resource is located on symbols corresponding to a synchronization signal block.

In some possible implementations, the specific time-frequency resource includes at least one symbol corresponding to a physical broadcast channel PBCH of the synchronization signal block.

In some possible implementations, in the specific time-frequency resource, a plurality of resource elements REs mapped to the reference signal are not adjacent in time domain and not adjacent in frequency domain, or a plurality of REs mapped to the reference signal are adjacent in time domain and not adjacent in frequency domain, or a plurality of REs mapped to the reference signal are adjacent in frequency domain and not adjacent in time domain.

In some possible implementations, the reference signal is not sent on the at least one symbol corresponding to the PBCH.

In some possible implementations, a quantity of REs mapped to the reference signal in a first area of the specific time-frequency resource is greater than a quantity of REs mapped to the reference signal in a second area of the specific time-frequency resource, a primary synchronization signal and/or a secondary synchronization signal of the synchronization signal block are/is not sent on a subcarrier corresponding to the first area, and the primary synchronization signal and/or the secondary synchronization signal are/is sent on a subcarrier corresponding to the second area.

In some possible implementations, the specific time-frequency resource further includes a symbol corresponding to the primary synchronization signal and/or the secondary synchronization signal of the synchronization signal block.

In a third area of the specific time-frequency resource, the reference signal is sent on the symbol corresponding to the primary synchronization signal and/or the secondary synchronization signal. In a fourth area of the specific time-frequency resource, the reference signal is not sent on the symbol corresponding to the primary synchronization signal and/or the secondary synchronization signal. The primary synchronization signal and/or the secondary synchronization signal are/is not sent on a subcarrier corresponding to the third area. The primary synchronization signal and/or the secondary synchronization signal are/is sent on a subcarrier corresponding to the fourth area.

In some possible implementations, a frequency domain range of the specific time-frequency resource is a subcarrier corresponding to the PBCH of the synchronization signal block.

In some possible implementations, the reference signal is generated by using a time-frequency resource unit as a unit, and the time-frequency resource unit is located on the symbols corresponding to the synchronization signal block.

In some possible implementations, the time-frequency resource unit is a time-frequency resource corresponding to the PBCH of the synchronization signal block on at least one physical resource block PRB, or the time-frequency resource unit is a time-frequency resource corresponding to the primary synchronization signal and/or the secondary synchronization signal of the synchronization signal block on at least one PRB, or the time-frequency resource unit is a time-frequency resource corresponding to the synchronization signal block on at least one PRB.

In some possible implementations, a parameter for generating the reference signal is associated with at least one of a cell ID, a subband sequence number, or a PRB sequence number.

In some possible implementations, the reference signal is mapped by using the time-frequency resource unit as a unit.

In some possible implementations, a manner of mapping the reference signal is associated with at least one of the cell ID, the subband sequence number, the PRB sequence number, and an antenna port number.

According to a fourth aspect, a signal transmission method is provided, including receiving a reference signal, where the reference signal is generated by using a time-frequency resource unit as a unit, and the time-frequency resource unit is located on symbols corresponding to a synchronization signal block.

In some possible implementations, the time-frequency resource unit is a time-frequency resource corresponding to a physical broadcast channel PBCH of the synchronization signal block on at least one physical resource block PRB, or the time-frequency resource unit is a time-frequency resource corresponding to a primary synchronization signal and/or a secondary synchronization signal of the synchronization signal block on at least one PRB, or the time-frequency resource unit is a time-frequency resource corresponding to the synchronization signal block on at least one PRB.

In some possible implementations, a parameter for generating the reference signal is associated with at least one of a cell ID, a subband sequence number, or a PRB sequence number.

In some possible implementations, the reference signal is mapped by using the time-frequency resource unit as a unit.

In some possible implementations, a manner of mapping the reference signal is associated with at least one of the cell ID, the subband sequence number, the PRB sequence number, and an antenna port number.

According to a fifth aspect, a signal transmission apparatus is provided. The signal transmission apparatus includes a processor and a transceiver, and can perform the method according to the first aspect or any possible implementation of the first aspect.

According to a sixth aspect, a signal transmission apparatus is provided. The signal transmission apparatus includes a processor and a transceiver, and can perform the method according to the second aspect or any possible implementation of the second aspect.

According to a seventh aspect, a signal transmission apparatus is provided. The signal transmission apparatus includes a processor and a transceiver, and can perform the method according to the third aspect or any possible implementation of the third aspect.

According to an eighth aspect, a signal transmission apparatus is provided. The signal transmission apparatus includes a processor and a transceiver, and can perform the method according to the fourth aspect or any possible implementation of the fourth aspect.

According to a ninth aspect, a computer storage medium is provided. The computer storage medium stores program code, and the program code can be used to instruct to perform the method according to any one of the first aspect to the fourth aspect or any possible implementation thereof.

According to a tenth aspect, a computer program product that includes an instruction is provided. When the instruction is executed on a computer, the computer performs the method according to any one of the first aspect to the fourth aspect or any possible implementation thereof.

DETAILED DESCRIPTION OF ILLUSTRATIVE EMBODIMENTS

The following describes the technical solutions of this application with reference to the accompanying drawings.

Figure 1:
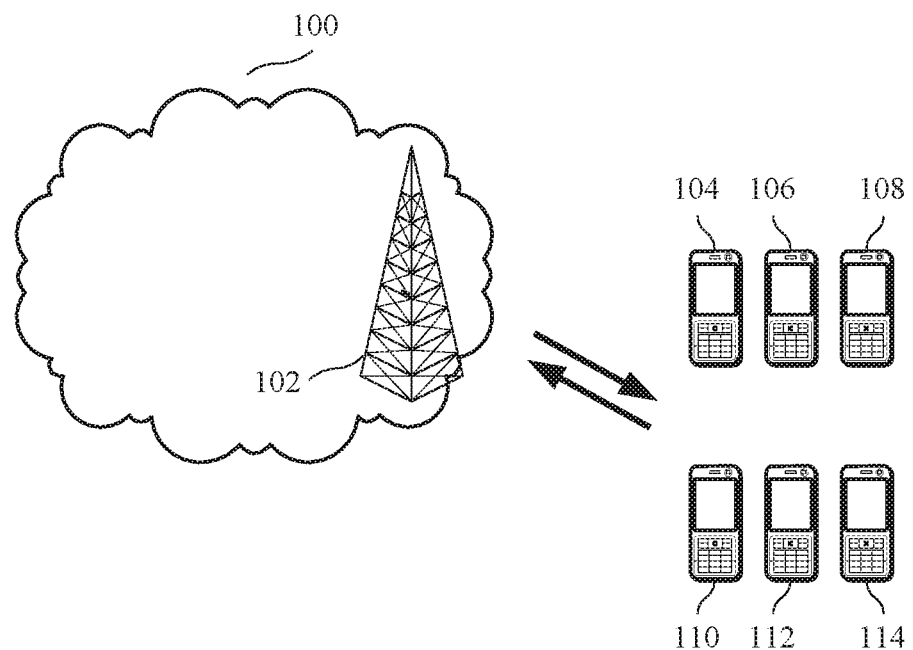
FIG. 1 is a schematic diagram of a system to which an embodiment of this application is applied.

FIG. 1 is a schematic diagram of a system to which an embodiment of this application is applied. As shown in FIG. 1, a system 100 may include a network device 102 and terminal devices 104, 106, 108, 110, 112, and 114. The network device and the terminal devices are connected in a wireless manner. It should be understood that only an example in which the system includes one network device is used in FIG. 1 for description. However, this embodiment of this application is not limited thereto. For example, the system may include more network devices. Similarly, the system may include more terminal devices. It should be further understood that the system may also be referred to as a network. This is not limited in this embodiment of this application.

This specification describes the embodiments with reference to a terminal device. The terminal device may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol ( ) phone, a wireless local loop (WLL) station, a personal digital assistant (PDA), a handheld device with a wireless communications function, a computing device or another processing device connected to a wireless modem, an in-vehicle device, a wearable device, a terminal device in a future 5G network, a terminal device in a future evolved public land mobile network (PLMN), or the like.

By way of example but not limitation, the terminal device may be a wearable device in the embodiments of this application. The wearable device may also be referred to as a wearable intelligent device, and is a generic term of wearable devices that are developed based on intelligent design of routine wear by using a wearable technology, such as glasses, gloves, watches, clothes, or shoes. The wearable device is a portable device that is directly worn on a human body or integrated into user's clothes or ornaments. The wearable device is not merely a hardware device, and further implements a powerful function through software support, data exchange, or cloud interaction. In a broad sense, the wearable intelligent device includes a full-featured and large-sized device that can implement all or some functions without relying on a smartphone, for example, a smartwatch or smart glasses; and includes a device that is dedicated to only one specific type of application function and that needs to be used in combination with another device such as a smartphone, for example, various smart bands or smart ornaments for vital sign monitoring.

This specification describes the embodiments with reference to a network device. The network device may be a device configured to communicate with the terminal device. The network device may be a base transceiver station (BTS) in the Global System for Mobile Communications (GSM) or Code Division Multiple Access (CDMA), a NodeB (NB) in a Wideband Code Division Multiple Access (WCDMA) system, an evolved NodeB (eNB or eNodeB) in a Long Term Evolution (LTE) system, or a radio controller in a cloud radio access network (CRAN) scenario. Alternatively, the network device may be a relay node, an access point, an in-vehicle device, a wearable device, a network device in a future 5G network, a network device in a future evolved PLMN, or the like.

In addition, in the embodiments of this application, the network device provides a cell with a service, and the terminal device communicates with the network device by using a transmission resource (for example, a frequency domain resource or a frequency spectrum resource) used in the cell. The cell may be a cell corresponding to the network device (for example, a base station). The cell may be a macro base station, or a base station corresponding to a small cell. The small cell herein may include a metro cell (Metro cell), a micro cell, a pico cell, a femto cell, and the like. These small cells feature in a small coverage area and low transmit power, and are suitable for providing a high-rate data transmission service. In addition, the cell may be a hypercell. It may be understood that the transmission service includes both an uplink transmission service and a downlink transmission service. In this application, transmission includes sending and/or receiving.

For the network device in this specification, by way of example but not limitation, one network device may be divided into one centralized unit (CU) and a plurality of transmission reception points (TRP)/distributed units (DU). In other words, a bandwidth based unit (BBU) of the network device is reconstructed as a DU function entity and a CU function entity. It needs to be noted that forms of and quantities of centralized units and TRPs/DUs shall not be construed as a limitation on the embodiments of this application.

The CU can process functions of a wireless high-layer protocol stack, such as a radio resource control (RRC) layer and a Packet Data Convergence Protocol (PDCP) layer, and even can also support moving of some core network functions down to an access network termed as an edge computing network, thereby meeting a higher network delay requirement of emerging services such as video, online shopping, and virtual/augmented reality in a future communications network.

The DU can mainly process physical layer functions and functions of a layer 2 that has a relatively high real time requirement. In consideration of transmission resources of a radio remote unit (RRU) and the DU, some physical layer functions of the DU may be moved up to the RRU. With miniaturization of the RRU, even more radically, the DU may be combined with the RRU.

The CU may be centrally disposed. Disposition of the DUs relies on an actual network environment. The DUs may be centrally disposed in a core urban area with relatively high traffic density and a relatively small inter-station distance, or an area with limited equipment room resources, for example, a college or a large-scale performance venue. The DUs may be disposed in a distributed manner in an area with sparse traffic and a large inter-station distance, for example, a suburban county or a mountainous area.

In consideration of a plurality of beams, a plurality of synchronization signal blocks (SS block, SSB) are used in a 5G NR system.

Figure 2:
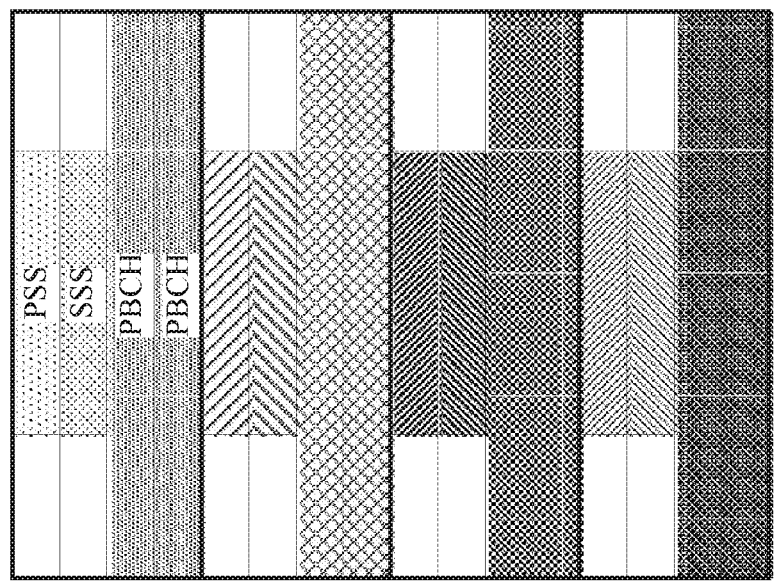
FIG. 2 is a schematic diagram of a resource structure of a synchronization signal block according to an embodiment of this application.

FIG. 2 is a schematic diagram of an example of but not a limitation on a resource structure of a synchronization signal block according to an embodiment of this application.

As shown in FIG. 2, each SSB may include a primary synchronization signal (PSS) on one orthogonal frequency division multiplexing (OFDM) symbol, a secondary synchronization signal (SSS) on one symbol, and PBCHs on two symbols. A sequence length of an NR-PSS/SSS is 127. The NR-PSS/SSS occupies 127 subcarriers (SC) in frequency domain, and an NR-PBCH occupies 288 subcarriers in frequency domain.

In some possible implementations, the NR-SSS may be used for coherent demodulation of the NR-PBCH.

Because bandwidth of the NR-PSS/SSS may be inconsistent with bandwidth of the NR-PBCH, even if an AP of the NR-SSS is consistent with an AP of the NR-PBCH, the coherent demodulation of the NR-PBCH may not completely rely on the NR-SSS. Therefore, a new resource structure of the NR-PBCH needs to be considered, and a reference signal needs to be used. The reference signal may be referred to as an NR-PBCH demodulation reference signal (DMRS). The NR-PBCH demodulation reference signal may be another name. This is not limited in this application.

In the embodiments of this application, for brevity, the NR-PSS, the NR-SSS, and the NR-PBCH in the synchronization signal block are respectively briefly referred to as a PSS, a SSS, and a PBCH. It should be understood that the PBCH may represent a broadcast signal.

It should be understood that in the embodiments of this application, locations of the PSS, the SSS, and the PBCH in the synchronization signal block may change. For example, a location of the PSS and a location of the SSS may interchange with each other, or the SSS may be located in the middle of the PBCHs. This is not limited in the embodiments of this application.

It should be understood that the reference signal provided in the technical solutions of the embodiments of this application may be used for PBCH demodulation, and may be further used for estimation of other channels. This is not limited in the embodiments of this application.

It should be understood that in the embodiments of this application, a symbol and a subcarrier respectively represent granularity units of a signal transmission time-frequency resource in time domain and frequency domain. The symbol and the subcarrier may have meanings in a current communications system, and may further have meanings in a future communications system. In addition, if names of the symbol and the subcarrier change in the future communications system, the symbol and the subcarrier may also be changed to names in the future communications system.

Figure 3:
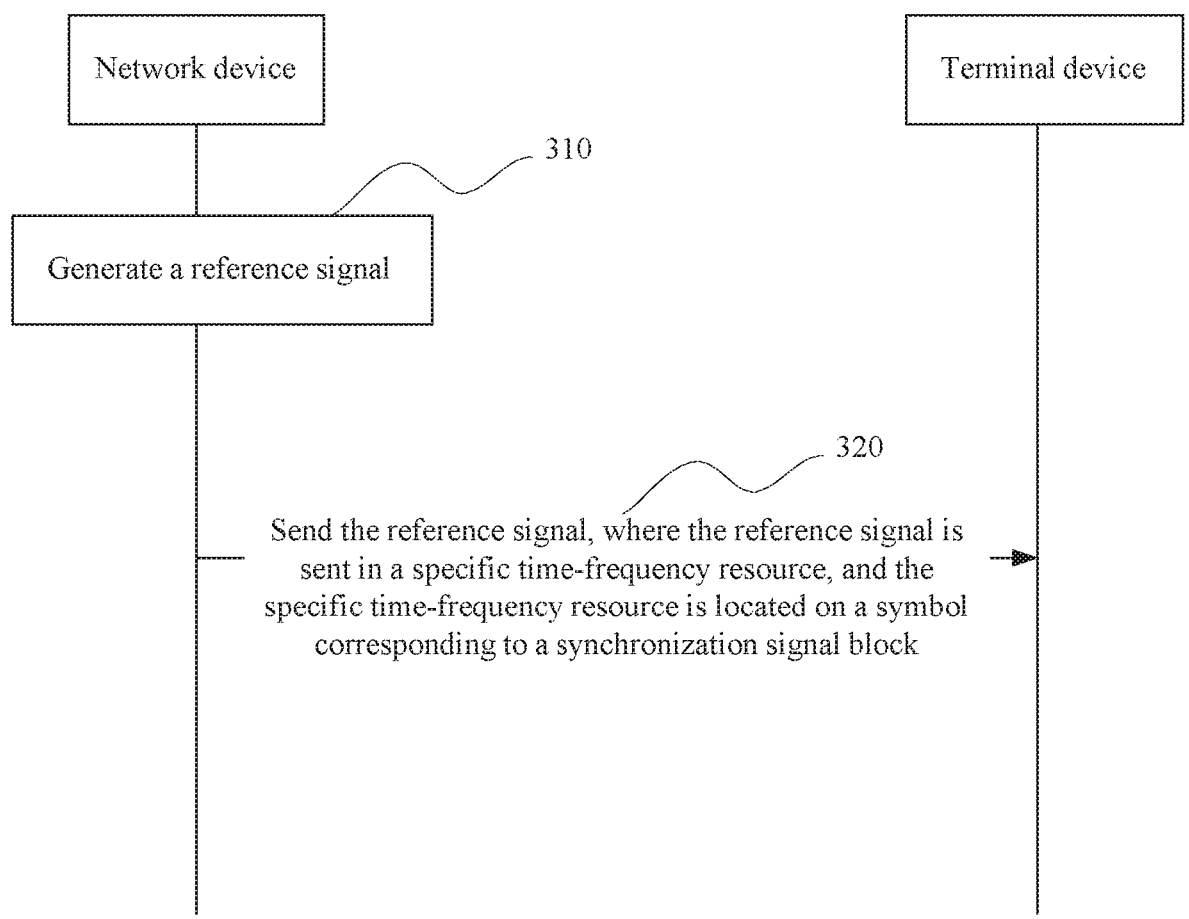
FIG. 3 is a schematic flowchart of a signal transmission method according to an embodiment of this application.

FIG. 3 is a schematic flowchart of a signal transmission method according to an embodiment of this application. In FIG. 3, a network device may be the network device 102 in FIG. 1, and a terminal device may be a terminal device in the terminal devices 104, 106, 108, 110, 112, and 114 in FIG. 1. Certainly, a quantity of network devices and a quantity of terminal devices in an actual system may not be limited to an example given in this embodiment or another embodiment, and details are not described below again.

310. The network device generates a reference signal. This step is optional.

Optionally, the reference signal in this embodiment of this application may be used for channel estimation, for example, PBCH demodulation. However, this is not limited in this embodiment of this application.

The network device may generate the reference signal based on a pseudo-random sequence. A manner of generating the reference signal by the network device is not limited in this embodiment of this application. A reference signal generation solution provided in another embodiment of this application is given in the following description, and the reference signal generation solution may also be used in this embodiment.

320. The network device sends the reference signal, where the reference signal is sent in a specific time-frequency resource, and the specific time-frequency resource is located on symbols corresponding to a synchronization signal block.

In this embodiment of this application, the specific time-frequency resource represents a time-frequency resource mapping range of the reference signal, and the specific time-frequency resource may also be referred to as a specific time-frequency resource area. The specific time-frequency resource is located on the symbols corresponding to the synchronization signal block. To be specific, in this embodiment of this application, the reference signal can be sent only in the specific time-frequency resource area on the symbols corresponding to the synchronization signal block, instead of being distributed on entire system bandwidth of a radio frame. In this way, the reference signal in this embodiment of this application can be used to ensure demodulation of a signal on the symbols corresponding to the synchronization signal block, for example, PBCH demodulation. In addition, a relatively small quantity of time-frequency resources is occupied, thereby reducing resource overheads.

Optionally, in an embodiment of this application, the reference signal is sent in the specific time-frequency resource. To be specific, the reference signal is discretely mapped in the specific time-frequency resource. It may also be understood that resource elements (RE) mapped to the reference signal are not centrally or not consecutively distributed.

Optionally, in the specific time-frequency resource, a plurality of REs mapped to the reference signal may be not adjacent in time domain and not adjacent in frequency domain; or a plurality of REs mapped to the reference signal are adjacent in time domain and not adjacent in frequency domain; or a plurality of REs mapped to the reference signal are adjacent in frequency domain and not adjacent in time domain.

In this embodiment of this application, a time domain range of the specific time-frequency resource is the symbols corresponding to the synchronization signal block, and may be some of the symbols corresponding to the synchronization signal block, for example, a symbol corresponding to a PBCH of the synchronization signal block or a symbol corresponding to a primary synchronization signal and/or a secondary synchronization signal of the synchronization signal block, or may be all of the symbols corresponding to the synchronization signal block. A frequency domain range of the specific time-frequency resource may be a subcarrier corresponding to the PBCH of the synchronization signal block, or may be entire system bandwidth or partial bandwidth, or the like. In examples in the following embodiments, the frequency domain range of the specific time-frequency resource is the subcarrier corresponding to the PBCH of the synchronization signal block. However, this is not limited in the embodiments of this application.

Optionally, in an embodiment of this application, the specific time-frequency resource includes at least one symbol corresponding to the PBCH of the synchronization signal block.

Specifically, the specific time-frequency resource may include the symbol corresponding to the PBCH of the synchronization signal block, but not include a symbol corresponding to a synchronization signal of the synchronization signal block. In other words, the reference signal can be sent only in the symbol corresponding to the PBCH.

For example, the reference signal can be sent only in a specific time-frequency resource of 288 subcarriers and two symbols that are corresponding to the PBCH. In other words, the specific time-frequency resource may be the 288 subcarriers and the two symbols that are corresponding to the PBCH.

Figure 4:
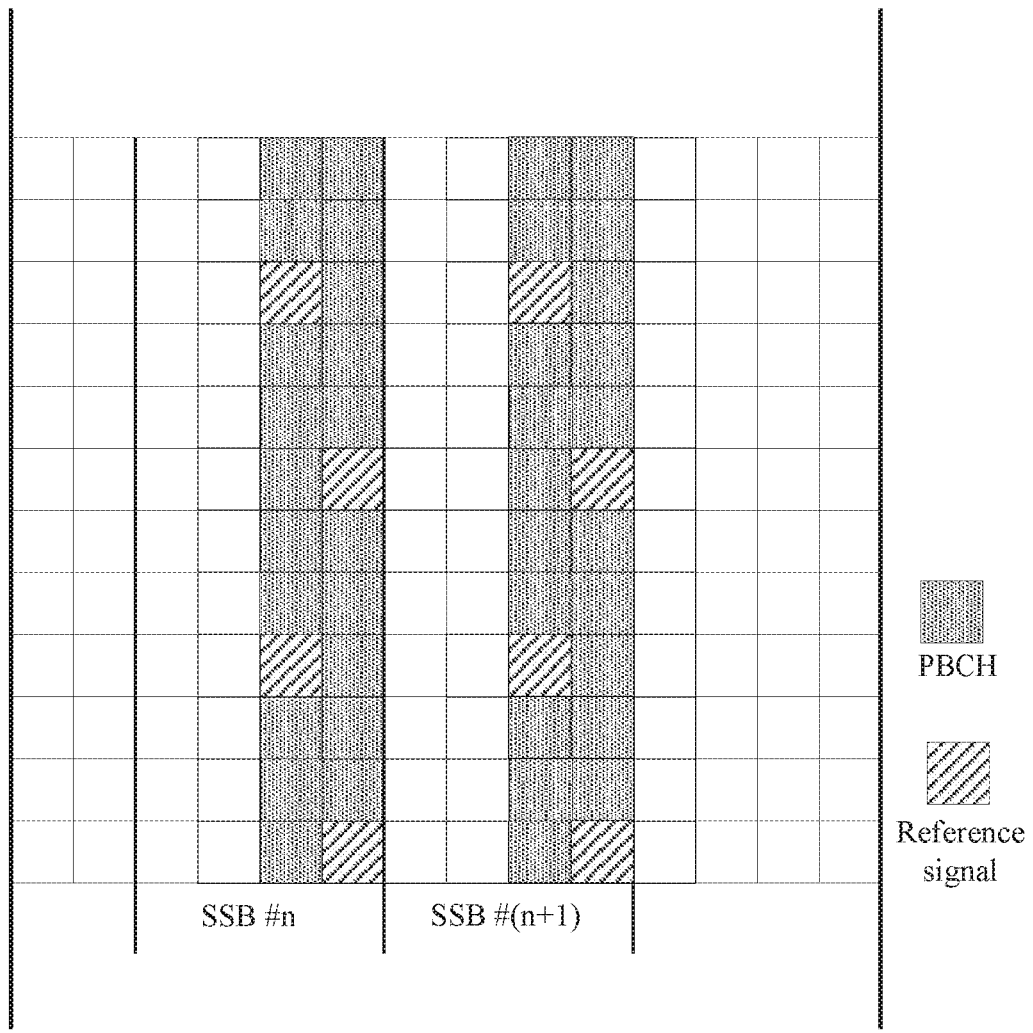
FIG. 4 is a schematic diagram of a manner of mapping a reference signal according to an embodiment of this application.

Optionally, in an embodiment of this application, as shown in FIG. 4, the reference signal is sent only in two symbols corresponding to the PBCH. The plurality of REs mapped to the reference signal is not adjacent in time domain and not adjacent in frequency domain. In other words, the reference signal is mapped to REs that are interleaved in time domain and frequency domain.

Figure 5:
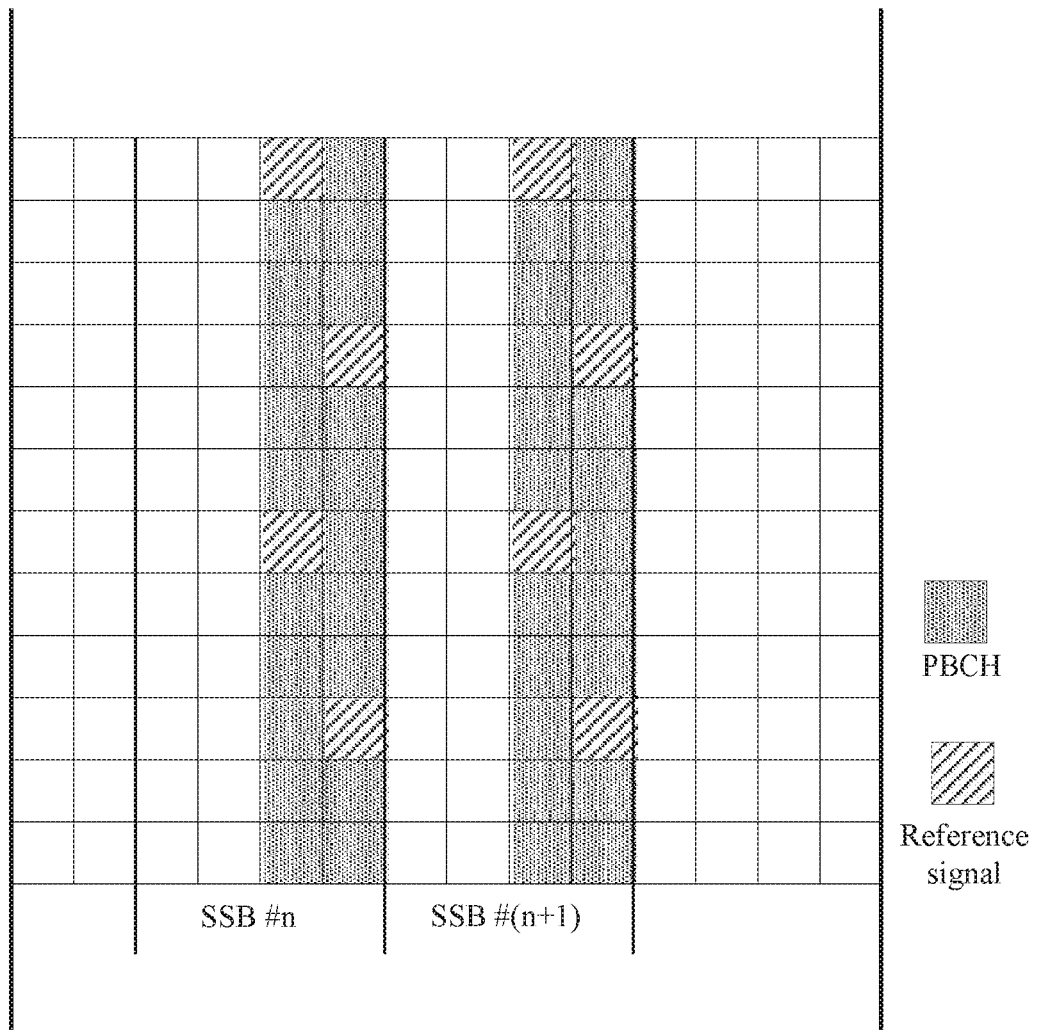
FIG. 5 is a schematic diagram of a manner of mapping a reference signal according to another embodiment of this application.

Optionally, reference signals of different cells may be mapped to different resource locations. To be specific, resource mapping of the reference signal may rely on a cell identifier, thereby avoiding mutual reference signal interference between cells. As shown in FIG. 5, resource locations of a reference signal in another cell different from that in FIG. 4 may be different from those in FIG. 4.

When performing channel estimation, the terminal device may perform linear interpolation on a neighboring reference signal to relatively precisely estimate an RE to which no reference signal is mapped, thereby ensuring PBCH demodulation accuracy.

In this embodiment, a reference signal exists on a symbol corresponding to each PBCH. Therefore, for PBCH demodulation, channel estimation may be performed without relying on a synchronization signal.

Figure 6:
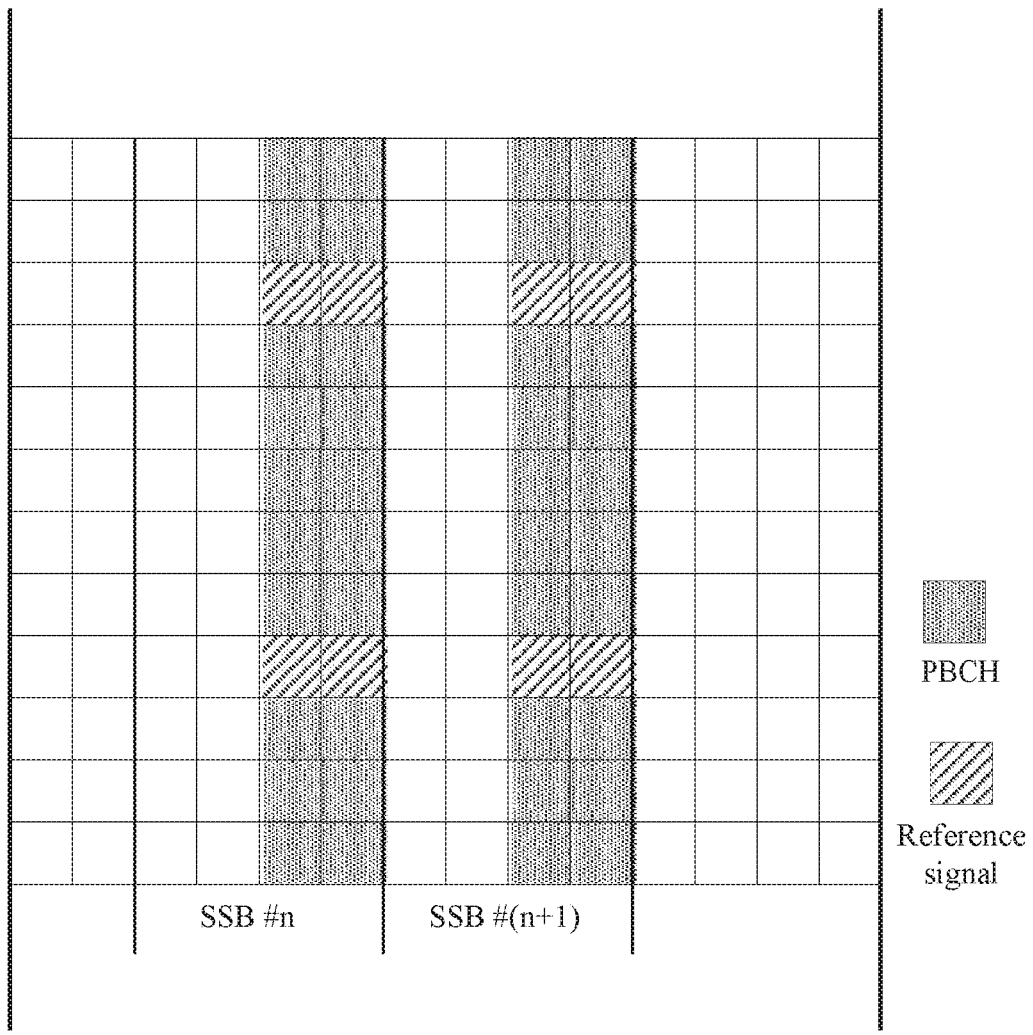
FIG. 6 is a schematic diagram of a manner of mapping a reference signal according to still another embodiment of this application.

Optionally, in an embodiment of this application, as shown in FIG. 6, the reference signal is sent only in two symbols corresponding to the PBCH. Two REs mapped to the reference signal are adjacent in time domain and not adjacent in frequency domain. In other words, the reference signal is mapped to REs that are consecutive in time domain.

Figure 7:
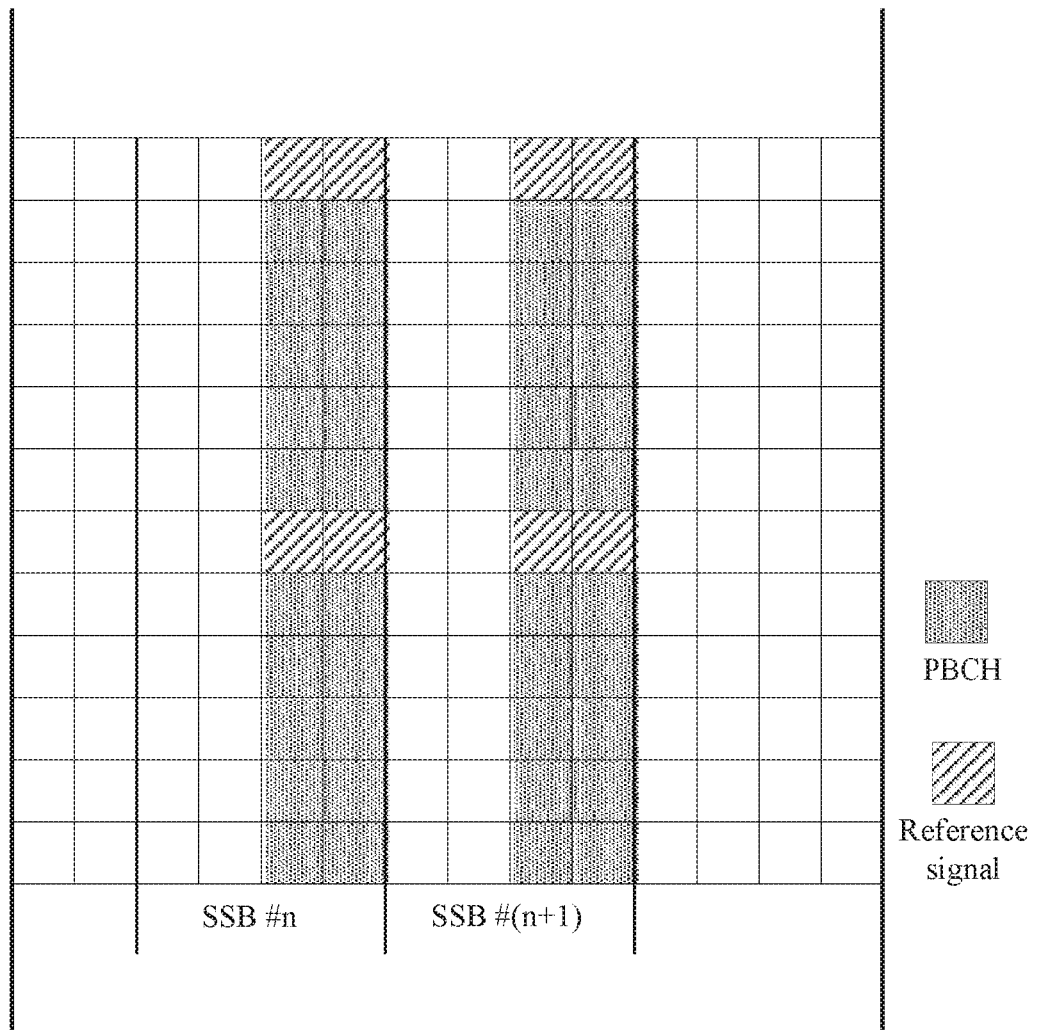
FIG. 7 is a schematic diagram of a manner of mapping a reference signal according to yet another embodiment of this application.

Optionally, reference signals of different cells may be mapped to different resource locations. To be specific, resource mapping of the reference signal may rely on a cell identifier, thereby avoiding mutual reference signal interference between cells. As shown in FIG. 7, resource locations of a reference signal in another cell different from that in FIG. 6 may be different from those in FIG. 6.

In this embodiment, the reference signal is mapped to the REs that are consecutive in time domain, so that a quantity of APs of the reference signal can be increased by using orthogonal cover code (OCC) on consecutive resources, thereby supporting a multi-AP PBCH transmission solution.

In the foregoing embodiment, the REs mapped to the reference signal are adjacent in time domain and not adjacent in frequency domain. Optionally, the REs mapped to the reference signal may be adjacent in frequency domain and not adjacent in time domain. In other words, the reference signal may be mapped to REs that are consecutive in frequency domain. In this way, similarly, a quantity of APs of the reference signal can be increased by using orthogonal cover code on consecutive resources, thereby supporting a multi-AP PBCH transmission solution.

Optionally, in an embodiment of this application, the reference signal is not sent on the at least one symbol corresponding to the PBCH. It may also be understood that the reference signal is sent on some symbols corresponding to the PBCH.

In this embodiment, the reference signal is not sent on all symbols corresponding to the PBCH. For example, the reference signal may be sent on only one symbol corresponding to the PBCH, or sent on none of the symbols corresponding to the PBCH.

Figure 8:
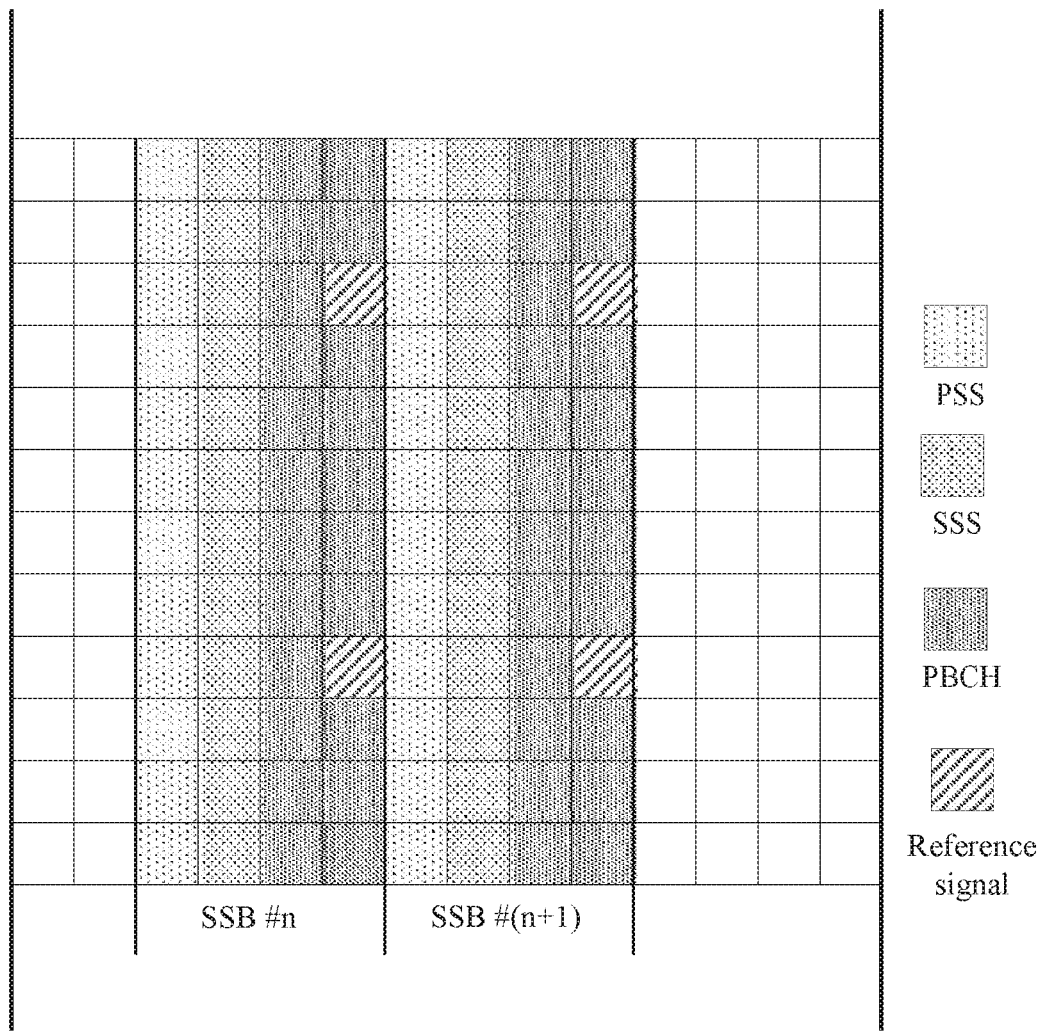
FIG. 8 is a schematic diagram of a manner of mapping a reference signal according to still yet another embodiment of this application.
Figure 9:
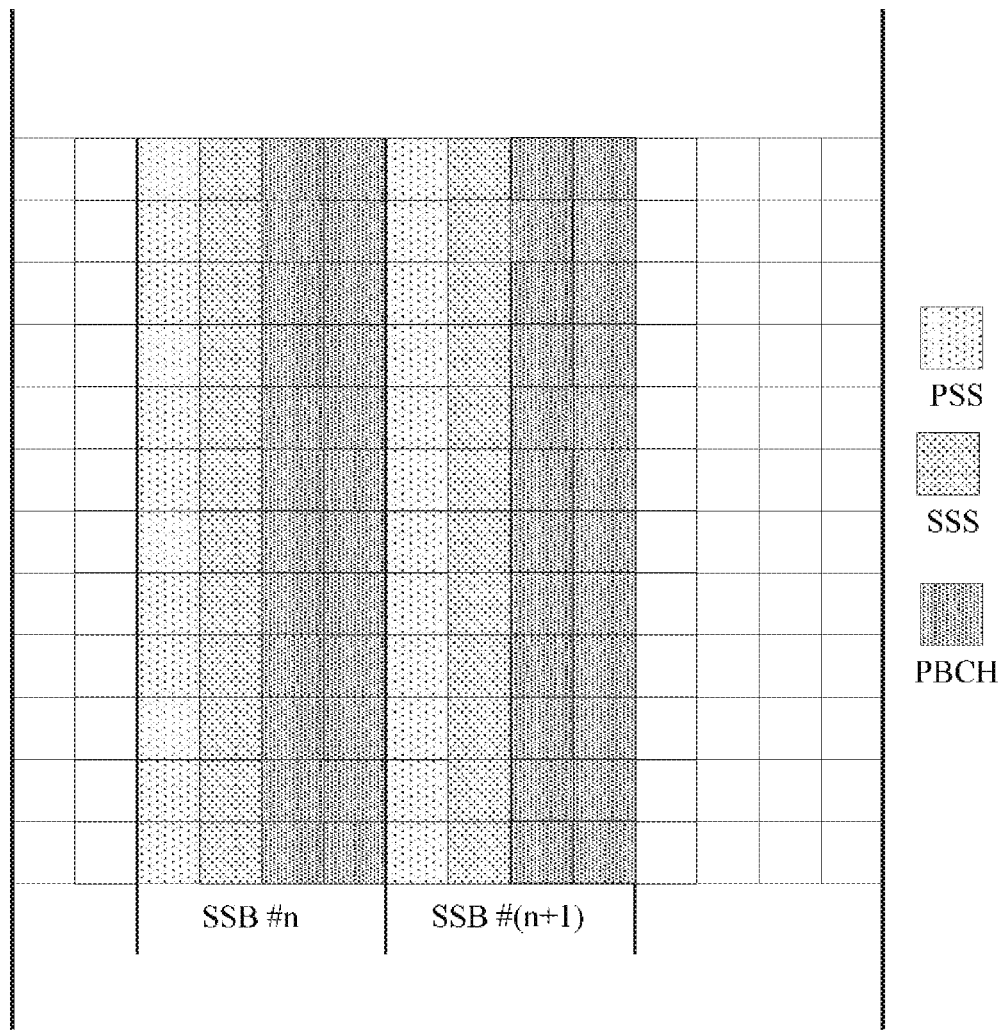
FIG. 9 is a schematic diagram of a manner of mapping a reference signal according to a further embodiment of this application.

For example, as shown in FIG. 8, the reference signal is sent on only one symbol corresponding to the PBCH. As shown in FIG. 9, the reference signal is sent on neither of two symbols corresponding to the PBCH.

Similar to the foregoing embodiments, reference signals of different cells may be mapped to different resource locations. To be specific, resource mapping of the reference signal may rely on a cell identifier, thereby avoiding mutual reference signal interference between cells. For brevity, details are not described again in the following embodiments.

When the reference signal is sent on neither of the two symbols corresponding to the PBCH, the terminal device performs channel estimation based on a SSS. When the reference signal is sent on one symbol corresponding to the PBCH, when performing channel estimation, the terminal device may perform linear interpolation on a SSS and a neighboring reference signal to relatively precisely estimate an RE to which no reference signal is mapped, thereby ensuring PBCH demodulation accuracy. In this way, resource overheads of the reference signal in the symbol corresponding to the PBCH are reduced.

Optionally, in an embodiment of this application, a quantity of REs mapped to the reference signal in a first area of the specific time-frequency resource is greater than a quantity of REs mapped to the reference signal in a second area of the specific time-frequency resource, the primary synchronization signal and/or the secondary synchronization signal of the synchronization signal block are/is not sent on a subcarrier corresponding to the first area, and the primary synchronization signal and/or the secondary synchronization signal are/is sent on a subcarrier corresponding to the second area.

Specifically, because bandwidth of a synchronization signal is inconsistent with bandwidth of the PBCH, two areas exist in the specific time-frequency resource. The primary synchronization signal and/or the secondary synchronization signal of the synchronization signal block are/is not sent on the subcarrier corresponding to the first area, and the primary synchronization signal and/or the secondary synchronization signal are/is sent on the subcarrier corresponding to the second area. For the two types of areas, different quantities of REs may be used to map to the reference signal. To be specific, the quantity of REs mapped to the reference signal in the first area may be greater than the quantity of REs mapped to the reference signal in the second area.

Figure 10:
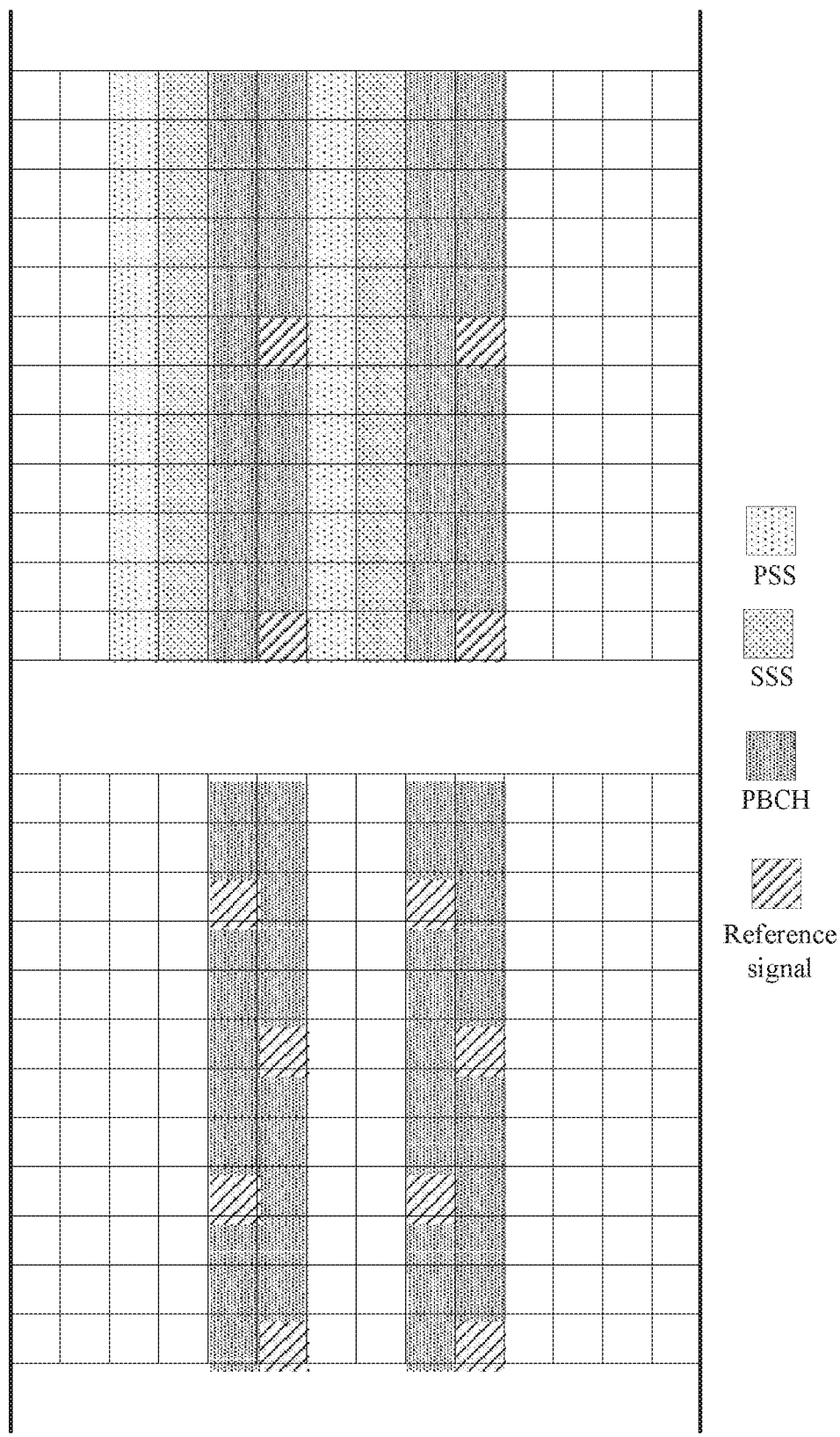
FIG. 10 is a schematic diagram of a manner of mapping a reference signal according to a still further embodiment of this application.

For example, in FIG. 10, a synchronization signal is sent in the upper area, and no synchronization signal is sent in the lower area. Therefore, reference signal resources are relatively sparse in an upper area of the symbol corresponding to the PBCH, and reference signal resources are relatively dense in a lower area of the symbol corresponding to the PBCH.

When a SSS is sent, the terminal device may improve PBCH estimation accuracy by performing linear interpolation on the SSS, thereby lowering a requirement for the reference signal.

Optionally, in an embodiment of this application, the specific time-frequency resource may further include the symbol corresponding to the primary synchronization signal and/or the secondary synchronization signal of the synchronization signal block.

In a third area of the specific time-frequency resource, the reference signal is sent on the symbol corresponding to the primary synchronization signal and/or the secondary synchronization signal. In a fourth area of the specific time-frequency resource, the reference signal is not sent on the symbol corresponding to the primary synchronization signal and/or the secondary synchronization signal. The primary synchronization signal and/or the secondary synchronization signal are/is not sent on a subcarrier corresponding to the third area. The primary synchronization signal and/or the secondary synchronization signal are/is sent on a subcarrier corresponding to the fourth area.

Specifically, in this embodiment, the specific time-frequency resource is expanded to further include the symbol corresponding to the primary synchronization signal and/or the secondary synchronization signal of the synchronization signal block. In addition, when the bandwidth of the synchronization signal is inconsistent with the bandwidth of the PBCH, in an area in which the primary synchronization signal and/or the secondary synchronization signal are/is not sent, the reference signal is sent on the symbol corresponding to the primary synchronization signal and/or the secondary synchronization signal; and in an area in which the primary synchronization signal and/or the secondary synchronization signal are/is sent, the reference signal is not sent on the symbol corresponding to the primary synchronization signal and/or the secondary synchronization signal.

Figure 11:
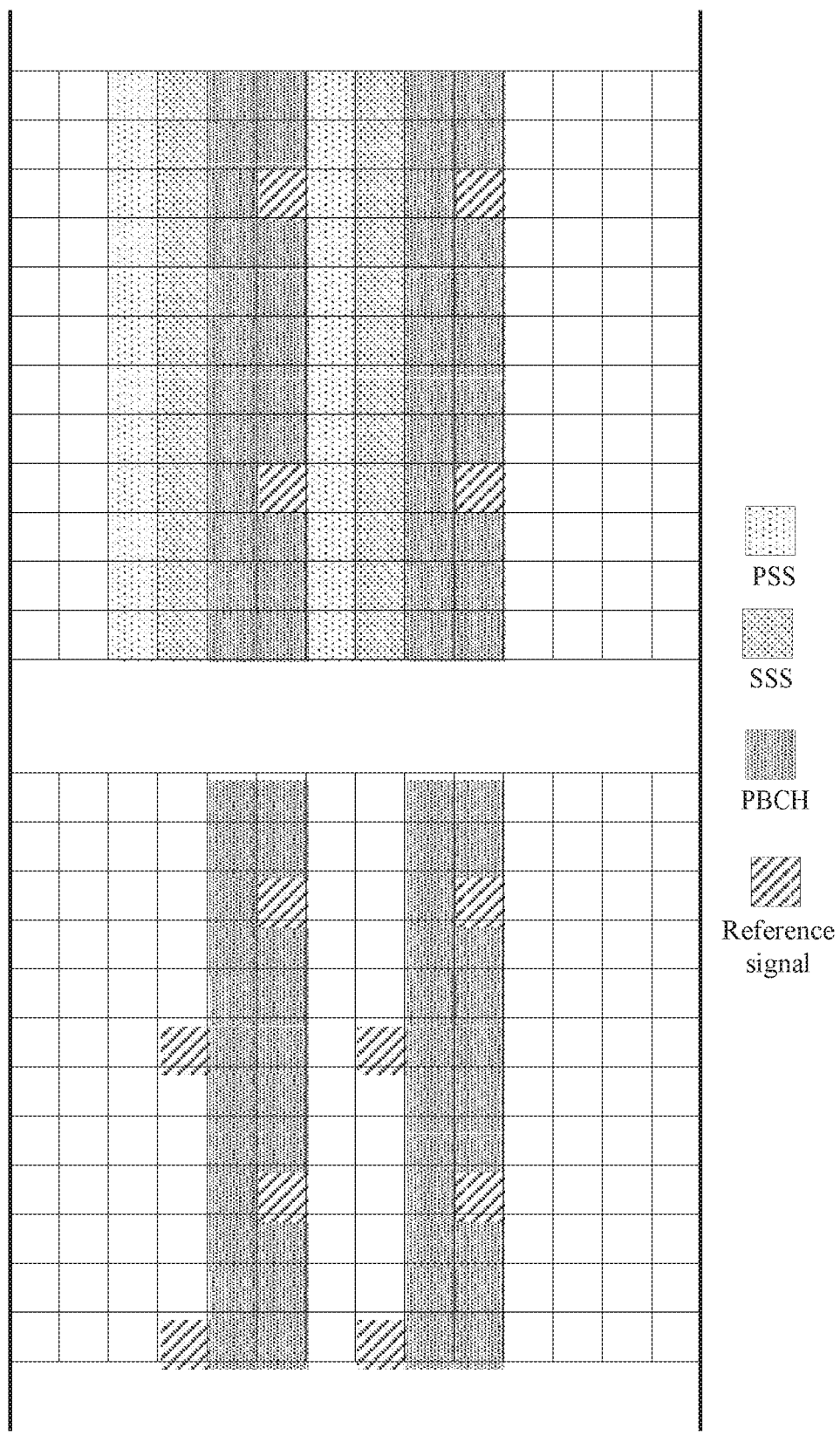
FIG. 11 is a schematic diagram of a manner of mapping a reference signal according to a yet further embodiment of this application.

For example, in FIG. 11, no secondary synchronization signal is sent in the lower area. Therefore, the reference signal is sent in a lower area of a symbol corresponding to the secondary synchronization signal. Optionally, no or few reference signals may be sent in a lower area of the symbol corresponding to the PBCH.

In this way, on a PRB without a SSS, the terminal device may improve PBCH estimation accuracy by performing linear interpolation on a time-domain reference signal while no or few resources of the PBCH are occupied.

It should be understood that some changes may be made to the embodiments of this application. For example, the resource locations of the reference signal or a quantity of reference signals may be properly changed. These changes should also be considered as embodiments of this application. For brevity, these similar changes are not described one by one.

It should be understood that the implementations of the embodiments of this application may be separately implemented or jointly implemented. This is not limited in the embodiments of this application.

Various solutions for mapping a reference signal to resource locations are given in the foregoing embodiments. It should be understood that a specific manner of mapping a reference signal sequence to resource locations is not limited in the embodiments of this application. A specific mapping manner provided in another embodiment of this application is given in the following description, and the specific mapping manner may be combined into this embodiment.

For transmission of the reference signal, the terminal device receives the reference signal accordingly and performs subsequent processing, for example, performs channel estimation based on the reference signal. The receiving by the terminal device corresponds to the sending by the network device, and therefore details are not described again.

The resource locations to which the reference signal is mapped are described in the foregoing embodiments. The embodiments of this application further provide a reference signal generation solution, which is described below in detail. It should be understood that the following embodiments may be combined with the foregoing embodiments. For example, the reference signal may be generated in the manner in the following embodiments, and then sent in the transmission manner in the foregoing embodiments. In addition, for the following embodiments, refer to related description in the foregoing embodiments. For brevity, details are not described again.

Figure 12:
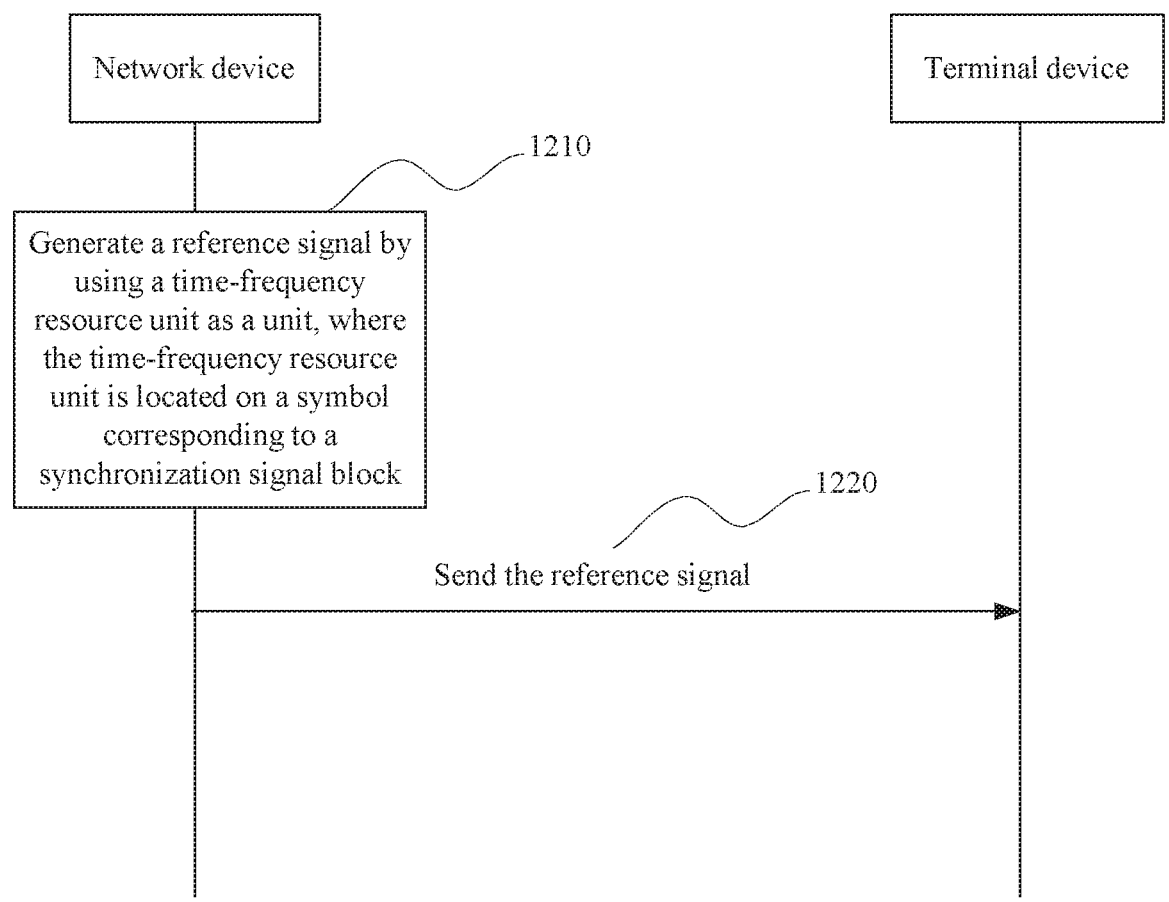
FIG. 12 is a schematic flowchart of a signal transmission method according to another embodiment of this application.

FIG. 12 is a schematic flowchart of a signal transmission method according to another embodiment of this application.

1210. A network device generates a reference signal by using a time-frequency resource unit as a unit, where the time-frequency resource unit is located on symbols corresponding to a synchronization signal block.

In this embodiment of this application, the time-frequency resource unit is located on the symbols corresponding to the synchronization signal block, and the network device generates the reference signal by using the time-frequency resource unit as a unit. In other words, a unit based on which the network device generates the reference signal is limited to the symbols corresponding to the synchronization signal block, instead of a radio frame. In this way, a reference signal sequence may be repeated for different synchronization signal blocks, and therefore a terminal device does not need to extract a sequence from a long sequence during reference signal detection.

In this embodiment of this application, a time domain range of the time-frequency resource unit is the symbols corresponding to the synchronization signal block, and may be all of the symbols corresponding to the synchronization signal block or some of the symbols corresponding to the synchronization signal block. For example, the time domain range of the time-frequency resource unit may be a symbol corresponding to a PBCH of the synchronization signal block, or a symbol corresponding to a primary synchronization signal and/or a secondary synchronization signal of the synchronization signal block. A frequency domain range of the time-frequency resource unit may be all subcarriers corresponding to the synchronization signal block, or subcarriers of one or more PRBs corresponding to the synchronization signal block, or entire system bandwidth. This is not limited in this embodiment of this application.

Optionally, in an embodiment of this application, the time-frequency resource unit is a time-frequency resource corresponding to the PBCH of the synchronization signal block on at least one PRB.

In other words, the time-frequency resource unit may be all time-frequency resources corresponding to the BPCH of the synchronization signal block, or a time-frequency resource corresponding to the PBCH of the synchronization block on one or more PRBs.

Optionally, in an embodiment of this application, the time-frequency resource unit is a time-frequency resource corresponding to the synchronization signal block on at least one PRB.

Optionally, in an embodiment of this application, the time-frequency resource unit is a time-frequency resource corresponding to the synchronization signal block.

Optionally, in an embodiment of this application, the time-frequency resource unit is a time-frequency resource corresponding to the primary synchronization signal and/or the secondary synchronization signal of the synchronization signal block on at least one PRB.

Optionally, in an embodiment of this application, for a multi-subband system, the frequency domain range of the time-frequency resource unit may be expanded to the entire system bandwidth.

The network device generates a reference signal sequence by using the time-frequency resource unit as a unit. In other words, a length of the reference signal sequence depends on the time-frequency resource unit.

Optionally, in an embodiment of this application, a parameter for generating the reference signal is associated with at least one of a cell ID, a subband sequence number, a PRB sequence number, and an antenna port number.

For example, the reference signal sequence may be in the following form:

$$r_{l,p}(m) = \frac{1}{\sqrt{2}}(1 - 2c(2m)) + j\frac{1}{\sqrt{2}}(1 - 2c(2m+1)), \quad (1)$$

where m indicates an $m^{th}$ unit (or referred to as element) in the sequence, l is a sequence number of an OFDM symbol in one SS block, values of m and l may be determined based on the time-frequency resource unit, p is the antenna port number, and $c^{(m)}$ is a pseudo-random sequence and may be initialized in the following manner:

$$c_{init} = f(l, p, N_{ID}^{cell}) \quad (2),$$

where $N_{ID}^{cell}$ is the cell ID.

In formula (1), the values of m and l may be determined based on the time-frequency resource unit, so that the length of the reference signal sequence may be determined based on the time-frequency resource unit. Therefore, the time-frequency resource unit is used as a unit for the reference signal sequence generated in this manner. To be specific, the reference signal sequence may be repeated on different time-frequency resource units, thereby preventing the terminal device from extracting a sequence from a long sequence during reference signal detection.

1220. The network device sends the reference signal. This processing is optional.

Optionally, in an embodiment of this application, the reference signal may be mapped by using the time-frequency resource unit as a unit.

After generating the reference signal by using the time-frequency resource unit as a unit, the network device may map the reference signal by using the time-frequency resource unit as a unit during the sending. In other words, a reference signal may be independently generated and mapped based on each time-frequency resource unit. This manner is easy to expand, and is not limited by a size of a physical channel resource block.

Optionally, in an embodiment of this application, a manner of mapping the reference signal is associated with at least one of the cell ID, the subband sequence number, the PRB sequence number, and the antenna port number.

For example, the foregoing sequence $r_{l,p}(m)$ is mapped to a complex modulation symbol $a_{k,l}^{(p)}$ and then is used as a reference symbol of a timeslot port:

$$a_{k,l}^{(p)} = r_{l,p}(m') \quad (3)$$

$$k = 6m + (v + v_{shift}) \bmod 6 \quad (4)$$

$$l = \begin{cases} 0, N_{symb}^{DL} - 3 & \text{if } p \in \{0, 1\} \\ 1 & \text{if } p \in \{2, 3\} \end{cases} \quad (5)$$

$$m = 0, 1, \ldots, 2 \cdot N_{RB}^{DL} - 1 \quad (6)$$

$$m' = m + N_{RB}^{max,DL} - N_{RB}^{DL}, \quad (7)$$

where variables v and $v_{shift}$ define a frequency-domain location of the reference signal, a frequency shift $v_{shift} = N_{ID}^{cell} \bmod 6$, $N_{RB}^{DL}$ represents configured downlink system bandwidth for which a resource block (RB) is used as a unit, $N_{RB}^{max,DL}$ represents maximum downlink system bandwidth for which a resource block (RB) is used as a unit, k is a subcarrier sequence number, and m is a mapping unit.

Optionally, because the PBCH has a limited quantity of transmission ports, for reference signals corresponding to different antenna ports, orthogonality may be ensured through frequency division multiplexing (FDM), time division multiplexing (TDM), or code division multiplexing (CDM) (OCC may be used).

For transmission of the reference signal, the terminal device receives the reference signal accordingly and performs subsequent processing, for example, performs channel estimation based on the reference signal. The receiving by the terminal device corresponds to the sending by the network device, and therefore details are not described again.

It should be understood that specific examples in the embodiments of this application are merely intended to help persons skilled in the art better understand the embodiments of this application, rather than limiting the scope of the embodiments of this application.

It should be understood that in the embodiments of this application, the sequence numbers of the foregoing processes do not mean execution orders. The execution orders of the processes should be determined based on functions and internal logic of the processes, and should not be construed as any limitation on the implementation processes in the embodiments of this application.

The signal transmission methods according to the embodiments of this application are described above in detail. The following describes signal transmission apparatuses according to the embodiments of this application.

Figure 13:
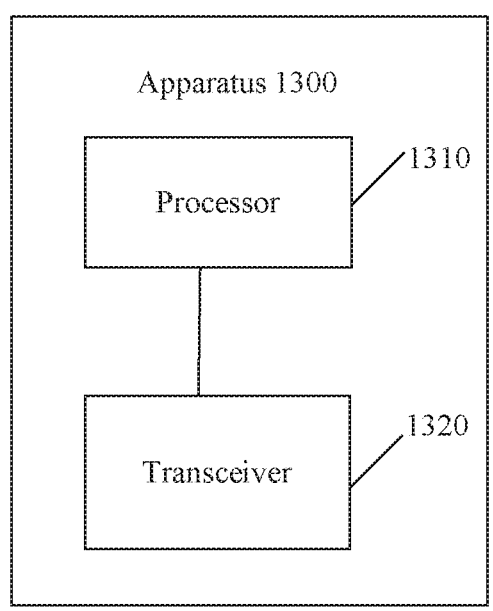
FIG. 13 is a schematic block diagram of a signal transmission apparatus according to an embodiment of this application.

FIG. 13 is a schematic block diagram of a signal transmission apparatus 1300 according to an embodiment of this application. The apparatus 1300 may be a network device.

It should be understood that the apparatus 1300 may correspond to the network device in the method embodiments, and may have any function of the network device in the methods.

As shown in FIG. 13, the apparatus 1300 includes a processor 1310 and a transceiver 1320.

In an embodiment, the processor 1310 is configured to generate a reference signal and the transceiver 1320 is configured to send the reference signal, where the reference signal is sent in a specific time-frequency resource, and the specific time-frequency resource is located on symbols corresponding to a synchronization signal block.

Optionally, the specific time-frequency resource includes at least one symbol corresponding to a physical broadcast channel PBCH of the synchronization signal block.

Optionally, in the specific time-frequency resource, a plurality of resource elements REs mapped to the reference signal are not adjacent in time domain and not adjacent in frequency domain, or a plurality of REs mapped to the reference signal are adjacent in time domain and not adjacent in frequency domain, or a plurality of REs mapped to the reference signal are adjacent in frequency domain and not adjacent in time domain.

Optionally, the reference signal is not sent on the at least one symbol corresponding to the PBCH.

Optionally, a quantity of REs mapped to the reference signal in a first area of the specific time-frequency resource is greater than a quantity of REs mapped to the reference signal in a second area of the specific time-frequency resource, a primary synchronization signal and/or a secondary synchronization signal of the synchronization signal block are/is not sent on a subcarrier corresponding to the first area, and the primary synchronization signal and/or the secondary synchronization signal are/is sent on a subcarrier corresponding to the second area.

Optionally, the specific time-frequency resource further includes a symbol corresponding to the primary synchronization signal and/or the secondary synchronization signal of the synchronization signal block.

In a third area of the specific time-frequency resource, the reference signal is sent on the symbol corresponding to the primary synchronization signal and/or the secondary synchronization signal. In a fourth area of the specific time-frequency resource, the reference signal is not sent on the symbol corresponding to the primary synchronization signal and/or the secondary synchronization signal. The primary synchronization signal and/or the secondary synchronization signal are/is not sent on a subcarrier corresponding to the third area. The primary synchronization signal and/or the secondary synchronization signal are/is sent on a subcarrier corresponding to the fourth area.

Optionally, a frequency domain range of the specific time-frequency resource is a subcarrier corresponding to the PBCH of the synchronization signal block.

Optionally, the processor 1310 is configured to generate the reference signal by using a time-frequency resource unit as a unit, where the time-frequency resource unit is located on the symbols corresponding to the synchronization signal block.

Optionally, the time-frequency resource unit is a time-frequency resource corresponding to the PBCH of the synchronization signal block on at least one physical resource block PRB, or the time-frequency resource unit is a time-frequency resource corresponding to the synchronization signal block.

Optionally, a parameter for generating the reference signal is associated with at least one of a cell ID, a subband sequence number, a PRB sequence number, and an antenna port number.

Optionally, the transceiver 1320 is configured to map the reference signal by using the time-frequency resource unit as a unit, or the processor 1310 is configured to map the reference signal by using the time-frequency resource unit as a unit.

Optionally, a manner of mapping the reference signal is associated with at least one of the cell ID, the subband sequence number, the PRB sequence number, and the antenna port number.

In another embodiment, the processor 1310 is configured to generate a reference signal by using a time-frequency resource unit as a unit, where the time-frequency resource unit is located on symbols corresponding to a synchronization signal block and the transceiver 1320 is configured to send the reference signal.

Optionally, the time-frequency resource unit is a time-frequency resource corresponding to a physical broadcast channel PBCH of the synchronization signal block on at least one physical resource block PRB, or the time-frequency resource unit is a time-frequency resource corresponding to the synchronization signal block.

Optionally, a parameter for generating the reference signal is associated with at least one of a cell ID, a subband sequence number, a PRB sequence number, and an antenna port number.

Optionally, the transceiver 1320 is configured to map the reference signal by using the time-frequency resource unit as a unit.

Optionally, a manner of mapping the reference signal is associated with at least one of the cell ID, the subband sequence number, the PRB sequence number, and the antenna port number.

Figure 14:
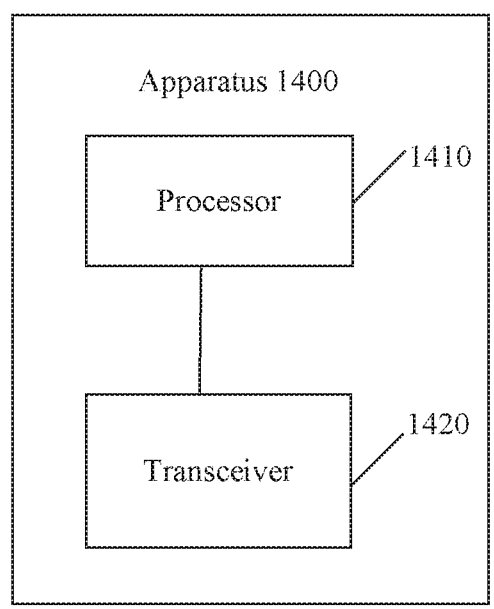
FIG. 14 is a schematic block diagram of a signal transmission apparatus according to another embodiment of this application.

FIG. 14 is a schematic block diagram of a signal transmission apparatus 1400 according to another embodiment of this application. The apparatus 1400 may be a terminal device.

It should be understood that the apparatus 1400 may correspond to the terminal device in the method embodiments, and may have any function of the terminal device in the methods.

As shown in FIG. 14, the apparatus 1400 includes a transceiver 1420, and optionally, further includes a processor 1410.

In an embodiment, the transceiver 1420 is configured to receive a reference signal, where the reference signal is sent in a specific time-frequency resource, and the specific time-frequency resource is located on symbols corresponding to a synchronization signal block.

Optionally, the processor 1410 is configured to perform channel estimation based on the reference signal.

Optionally, the specific time-frequency resource includes at least one symbol corresponding to a physical broadcast channel PBCH of the synchronization signal block.

Optionally, in the specific time-frequency resource, a plurality of resource elements REs mapped to the reference signal are not adjacent in time domain and not adjacent in frequency domain, or a plurality of REs mapped to the reference signal are adjacent in time domain and not adjacent in frequency domain, or a plurality of REs mapped to the reference signal are adjacent in frequency domain and not adjacent in time domain.

Optionally, the reference signal is not sent on the at least one symbol corresponding to the PBCH.

Optionally, a quantity of REs mapped to the reference signal in a first area of the specific time-frequency resource is greater than a quantity of REs mapped to the reference signal in a second area of the specific time-frequency resource, a primary synchronization signal and/or a secondary synchronization signal of the synchronization signal block are/is not sent on a subcarrier corresponding to the first area, and the primary synchronization signal and/or the secondary synchronization signal are/is sent on a subcarrier corresponding to the second area.

Optionally, the specific time-frequency resource further includes a symbol corresponding to the primary synchronization signal and/or the secondary synchronization signal of the synchronization signal block.

In a third area of the specific time-frequency resource, the reference signal is sent on the symbol corresponding to the primary synchronization signal and/or the secondary synchronization signal. In a fourth area of the specific time-frequency resource, the reference signal is not sent on the symbol corresponding to the primary synchronization signal and/or the secondary synchronization signal. The primary synchronization signal and/or the secondary synchronization signal are/is not sent on a subcarrier corresponding to the third area. The primary synchronization signal and/or the secondary synchronization signal are/is sent on a subcarrier corresponding to the fourth area.

Optionally, a frequency domain range of the specific time-frequency resource is a subcarrier corresponding to the PBCH of the synchronization signal block.

Optionally, the reference signal is generated by using a time-frequency resource unit as a unit, and the time-frequency resource unit is located on the symbols corresponding to the synchronization signal block.

Optionally, the time-frequency resource unit is a time-frequency resource corresponding to the PBCH of the synchronization signal block on at least one physical resource block PRB, or the time-frequency resource unit is a time-frequency resource corresponding to the synchronization signal block.

Optionally, a parameter for generating the reference signal is associated with at least one of a cell ID, a subband sequence number, or a PRB sequence number.

Optionally, the reference signal is mapped by using the time-frequency resource unit as a unit.

Optionally, a manner of mapping the reference signal is associated with at least one of the cell ID, the subband sequence number, the PRB sequence number, and an antenna port number.

In another embodiment, the transceiver 1420 is configured to receive a reference signal, where the reference signal is generated by using a time-frequency resource unit as a unit, and the time-frequency resource unit is located on symbols corresponding to a synchronization signal block.

Optionally, the apparatus 1400 further includes the processor 1410, configured to perform channel estimation based on the reference signal.

Optionally, the time-frequency resource unit is a time-frequency resource corresponding to a physical broadcast channel PBCH of the synchronization signal block on at least one physical resource block PRB, or the time-frequency resource unit is a time-frequency resource corresponding to the synchronization signal block.

Optionally, a parameter for generating the reference signal is associated with at least one of a cell ID, a subband sequence number, or a PRB sequence number.

Optionally, the reference signal is mapped by using the time-frequency resource unit as a unit.

Optionally, a manner of mapping the reference signal is associated with at least one of the cell ID, the subband sequence number, the PRB sequence number, and an antenna port number.

It should be understood that the processor 1310 or the processor 1410 in the embodiments of this application may be implemented by using a processing unit or a chip. Optionally, in an implementation process, the processing unit may include a plurality of units, such as a mapping unit, and/or a signal generation unit, and/or a channel estimation unit.

It should be understood that the transceiver 1320 or the transceiver 1420 in the embodiments of this application may be implemented by using a transceiver unit or a chip. Optionally, the transceiver 1320 or the transceiver 1420 may include a transmitter or a receiver, or may include a transmission unit or a receiving unit.

It should be understood that the processor 1310 and the transceiver 1320 in the embodiments of this application may be implemented by using a chip, and the processor 1410 and the transceiver 1420 may be implemented by using a chip.

Optionally, the network device or the terminal device may further include a memory, the memory may store program code, and the processor invokes the program code stored in the memory, to implement a corresponding function of the network device or the terminal device. Optionally, the processor and the memory may be implemented by using a chip.

An embodiment of this application further provides a processing apparatus, including a processor and an interface and the processor is configured to perform the methods in the foregoing embodiments of this application.

The processing apparatus may be a chip, and the processor may be implemented by using hardware or software. When being implemented by using hardware, the processor may be a logic circuit, an integrated circuit, or the like. When being implemented by using software, the processor may be a general-purpose processor, and is implemented by reading software code stored in a memory. The memory may be integrated into the processor, or may be located independently of the processor.

For example, the processing apparatus may be a field-programmable gate array (FPGA), an application-specific integrated circuit (ASIC), a system on chip (SoC), a central processing unit (CPU), a network processor (NP), a digital signal processor (DSP), a micro control unit (MCU), a programmable logic device (PLD), or another integrated chip.

An embodiment of this application further provides a communications system, including the network device in the foregoing network device embodiment and the terminal device in the terminal device embodiment.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk (SSD)), or the like.

It should be understood that the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Persons of ordinary skill in the art may be aware that in combination with the examples described in the embodiments disclosed in this specification, units and algorithm steps can be implemented by using electronic hardware or a combination of computer software and electronic hardware. Whether the functions are performed by using hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one place, or may be distributed on a plurality of network units. Some or all of the units may be selected based on actual requirements to achieve the objectives of the solutions of the embodiments.

In addition, the function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method comprising:
    generating a demodulation reference signal comprising a reference signal sequence, wherein the reference signal sequence is generated based on a cell ID; and
    sending the demodulation reference signal, wherein the demodulation reference signal is mapped to a plurality of resource elements (REs), and wherein the plurality of REs are located on a plurality of symbols to which a physical broadcast channel (PBCH) comprised in a synchronization signal block and a secondary synchronization signal (SSS) comprised in the synchronization signal block are mapped, the synchronization signal block comprising a primary synchronization signal (PSS), the SSS and the PBCH; and
    wherein REs for mapping the demodulation reference signal in a symbol where the SSS is mapped are located in a fourth frequency domain range, with the fourth frequency domain range not overlapping with a third frequency domain range where the SSS is mapped.

2. The method according to claim 1, wherein the plurality of REs comprises REs that are adjacent in a time domain and not adjacent in a frequency domain.

3. The method according to claim 1, wherein the plurality of REs are located on a plurality of subcarriers in a range of subcarriers corresponding to the PBCH.

4. The method according to claim 3, wherein a RE of the plurality of REs located on a symbol of the plurality of symbols is located on a subcarrier in the range of subcarriers corresponding to the PBCH.

5. The method according to claim 1, wherein locations of the plurality of REs are related to the cell ID.

6. The method according to claim 1, wherein the plurality of REs comprises a first set of REs located in a first time-frequency resource area and a second set of REs located in a second time-frequency resource area, and a quantity of the first set of REs is greater than a quantity of the second set of REs, wherein the first time-frequency resource area comprises subcarriers onto which the primary synchronization signal and the secondary synchronization signal are not mapped, and wherein the second time-frequency resource area comprises subcarriers onto which the secondary synchronization signal is mapped.

7. A signal transmission method comprising:
    receiving a demodulation reference signal on a plurality of resource elements (REs), wherein the demodulation reference signal comprises a reference signal sequence related to a cell ID, wherein the plurality of REs are located on a plurality of symbols to which a physical broadcast channel (PBCH) comprised in a synchronization signal block and a secondary synchronization signal (SSS) comprised in the synchronization signal block are mapped, the synchronization signal block comprising a primary synchronization signal (PSS), the SSS and the PBCH, and wherein REs of the plurality of REs in a symbol where the SSS is mapped are located in a fourth frequency domain range, with the fourth frequency domain range not overlapping with a third frequency domain range where the SSS is mapped; and performing a channel estimation based on the demodulation reference signal.

8. The method according to claim 7, wherein the plurality of REs comprises REs that are adjacent in a time domain and not adjacent in a frequency domain.

9. The method according to claim 7, wherein the plurality of REs are located on a plurality of subcarriers in a range of subcarriers corresponding to the PBCH.

10. The method according to claim 9, wherein a RE of the plurality of REs located on a symbol of the plurality of symbols is located on a subcarrier in the range of subcarriers corresponding to the PBCH.

11. The method according to claim 7, further comprising: determining locations of the plurality of REs according to the cell ID.

12. The method according to claim 7, wherein the plurality of REs comprises a first set of REs located in a first time-frequency resource area and a second set of REs located in a second time-frequency resource area, and a quantity of the first set of REs is greater than a quantity of the second set of REs, wherein the first time-frequency resource area comprises subcarriers onto which the primary synchronization signal and the secondary synchronization signal are not mapped, and wherein the second time-frequency resource area comprises subcarriers onto which the secondary synchronization signal is mapped.

13. An apparatus comprising:
a non-transitory memory storage comprising instructions; and
one or more processors in communication with the memory storage, wherein the instructions, when executed by the one or more processors, cause the apparatus to:
generate a demodulation reference signal comprising a reference signal sequence, wherein the reference signal sequence is generated based on a cell ID; and
send the demodulation reference signal, wherein the demodulation reference signal is mapped to a plurality of resource elements (REs), wherein the plurality of REs are located on a plurality of symbols to which a physical broadcast channel (PBCH) comprised in a synchronization signal block and a secondary synchronization signal (SSS) comprised in the synchronization signal block are mapped, the synchronization signal block comprising a primary synchronization signal (PSS), the SSS and the PBCH; and
wherein REs for mapping the demodulation reference signal in a symbol where the SSS is mapped are located in a fourth frequency domain range, with the fourth frequency domain range not overlapping with a third frequency domain range where the SSS is mapped.

14. The apparatus according to claim 13, wherein the plurality of REs comprises REs that are adjacent in a time domain and not adjacent in a frequency domain.

15. The apparatus according to claim 13, wherein the plurality of REs are located on a plurality of subcarriers in a range of subcarriers corresponding to the PBCH.

16. The apparatus according to claim 15, wherein a RE of the plurality of REs located on a symbol of the plurality of symbols is located on a subcarrier in the range of subcarriers corresponding to the PBCH.

17. The apparatus according to claim 13, wherein locations of the plurality of REs are based on the cell ID.

18. The apparatus according to claim 13, wherein the plurality of REs comprises a first set of REs located in a first time-frequency resource area and a second set of REs located in a second time-frequency resource area, and a quantity of the first set of REs is greater than a quantity of the second set of REs, wherein the first time-frequency resource area comprises subcarriers onto which the primary synchronization signal and the secondary synchronization signal are not mapped, and wherein the second time-frequency resource area comprises subcarriers onto which the secondary synchronization signal is mapped.

19. An apparatus comprising:
a non-transitory memory storage comprising instructions; and
one or more processors in communication with the memory storage, wherein the instructions, when executed by the one or more processors, cause the apparatus to:
receive a demodulation reference signal on a plurality of resource elements (REs), wherein the demodulation reference signal comprises a reference signal sequence related to a cell ID, wherein the plurality of REs are located on a plurality of symbols to which a physical broadcast channel (PBCH) comprised in a synchronization signal block and a secondary synchronization signal (SSS) comprised in the synchronization signal block are mapped, the synchronization signal block comprising a primary synchronization signal (PSS), the SSS and the PBCH, and wherein REs of the plurality of REs in a symbol where the SSS is mapped are located in a fourth frequency domain range, with the fourth frequency domain range not overlapping with a third frequency domain range where the SSS is mapped; and
perform a channel estimation based on the demodulation reference signal.

20. The apparatus according to claim 19, wherein the plurality of REs comprises REs that are adjacent in a time domain and not adjacent in a frequency domain.

21. The apparatus according to claim 19, wherein the plurality of REs are located on a plurality of subcarriers in a range of subcarriers corresponding to the PBCH.

22. The apparatus according to claim 21, wherein a RE of the plurality of REs located on a symbol of the plurality of symbols is located on a subcarrier in the range of subcarriers corresponding to the PBCH.

23. The apparatus according to claim 19, wherein the instructions, when executed by the one or more processors, cause the apparatus further to: determine locations of the plurality of REs according to the cell ID.

24. The apparatus according to claim 19, wherein the plurality of REs comprises a first set of REs located in a first time-frequency resource area and a second set of REs located in a second time-frequency resource area, and a quantity of the first set of REs is greater than a quantity of the second set of REs, wherein the first time-frequency resource area comprises subcarriers onto which the primary synchronization signal and the secondary synchronization signal are not mapped, and wherein the second time-frequency resource area comprises subcarriers onto which the secondary synchronization signal is mapped.

* * * * *